Feb. 7, 1956

O. M. RYBOLT 2,734,116

CONTROL SYSTEM FOR ELECTRIC WELDER

Filed March 23, 1954

INVENTOR.
ORA M. RYBOLT.
BY
Robert A. Sloman
ATTORNEY

United States Patent Office 2,734,116
Patented Feb. 7, 1956

2,734,116
CONTROL SYSTEM FOR ELECTRIC WELDER

Ora M. Rybolt, Lapeer, Mich.

Application March 23, 1954, Serial No. 418,038

9 Claims. (Cl. 219—8)

This invention relates to electric welding, and more particularly to control mechanism in conjunction with the operation of the welder generator.

It is the object of the present invention to provide, in conjunction with a conventional welder generator a manual control means under the control of the operator and at a point remote from the generator whereby at the will of the operator the generator voltage may be increased or decreased.

It is the further object of the present invention to provide a novel arrangement of relay switches in conjunction with a welder generator together with a novel electrical circuit interconnecting said relays and electric welder whereby the operator may control at a point remote from the generator increases or decreases of the welding voltage, if desired.

It is the further object of the present invention to provide a novel electrical control mechanism in conjunction with an electric welder whereby the generating mechanism therefore may be started by the operator at a point remote therefrom.

It is the further object of the present invention to provide an electrical circuit in conjunction with said welder generator, whereby the same will be automatically de-energized after a predetermined interval, if the welding operation is interrupted.

These and other objects will be seen from the following specification and claims in conjunction with the appended drawings, in which:

Figure 1:
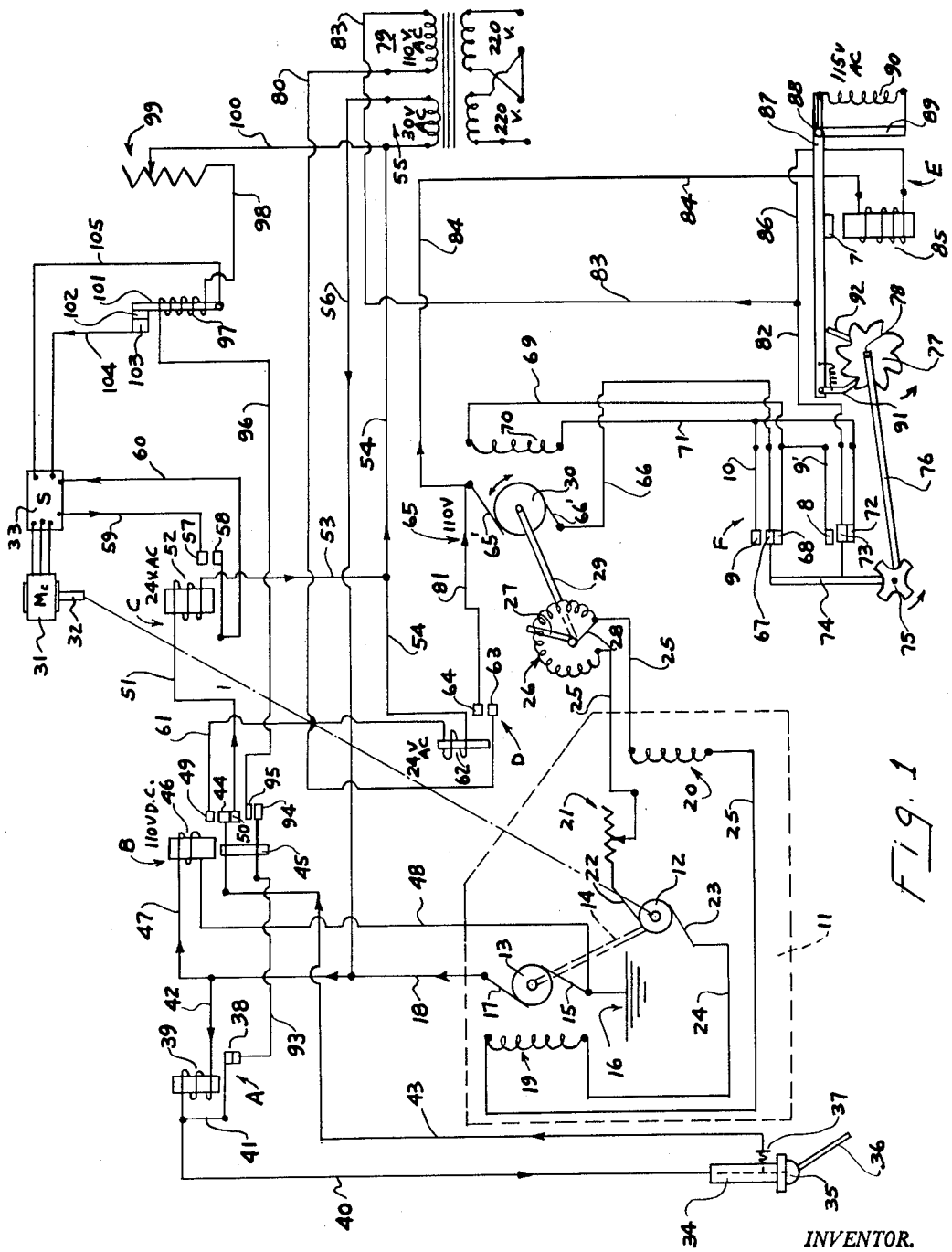
Fig. 1 is a diagrammatic illustration of a conventional welder generator, together with a series of relay control switches for effecting certain controlled operations of said generator.

Referring to the drawing, there is diagrammatically shown a welding mechanism and a generator therefor, together with a series of relay switches interconnected in a plurality of circuits for producing certain controlled operations of the generator, as more particularly hereinafter set forth.

Generally indicated at 11 is a conventional generator which is marked off in dash lines and which includes generator exciter 12, the main generator 13 interconnected by the shaft 14 for rotation in unison. One brush contact 15 for the generator is grounded at 16, and the second brush contact 17 terminates in the power output line 18.

There is provided a conventional main field winding 19 and the exciter field winding 20 connected in series by the lead wire 25, which also includes in the circuit the field rheostat 21, which joins brush contact 22 of exciter 12. Brush contact 23 is joined to the main field 19 by the lead wire 24.

Joined to the circuit of the main and exciter fields is the motor driven rheostat 26, and there is provided the rotatable arm 27 joined at its inner end by the connection 28 to lead wire 25. Consequently, rotation of arm 27 can cut in or out more or less additional resistance in the field circuit to thereby regulate the output voltage in power output line 18. Rotation to the left of arm 27 from the position shown in the drawing decreases the resistance and causes an increase of voltage, whereas a movement to the right from the position shown increases the resistance and effects a fall in the voltage.

The present invention has for one of its principal objects the remote control by the operator or welder of the rotation of arm 27. For this purpose, arm 27 is carried upon the end of a motor shaft 29 projecting from the rotor 30 of an electric motor, which in the preferred embodiment operates with 110 volts.

There is diagrammatically indicated at 31 a second motor with output shaft 32 adapted for connection with exciter 12 and shaft 14 to thereby furnish the motive power for generator 11.

Figure 2:
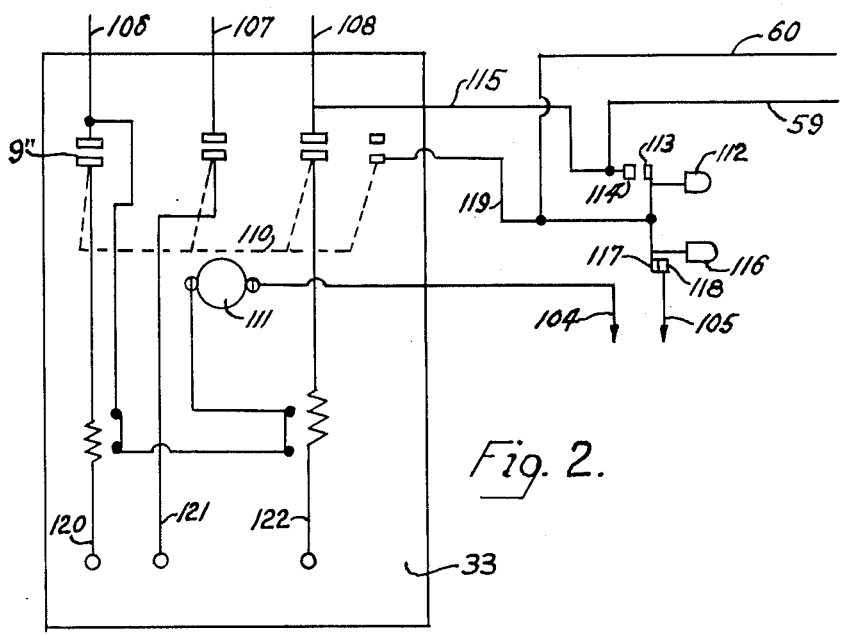
Fig. 2 is a diagrammatic fragmentary view of another portion of the electrical circuit including the magnetic motor starter for said generator.

There is also indicated in Fig. 1 a magnetic starter 33, more particularly set forth in Fig. 2, which in the manner hereafter described is initially energized by the operator of the electrode holder 34 for initiating the operation of motor 31 and generator 11.

The electrode holder includes a head 35 from which projects a conventional welding electrode 36. Mounted upon electrode holder 34 is a normally open manual control switch 37 which is normally spring-biased in open position.

In conjunction with the various controls forming a part of the present invention, there are provided a series of relay switches A, B, C, D, E, and F. Relay A includes a pair of normally closed contacts 38 connected with lead wires 41 and 93, and includes the magnetic coil 39 having a limited number of turns which is connected in series with electrode holder 34 by lead wire 40, the opposite end of coil 39 being connected by the lead 42 to generator output line 18.

Manual control 37 is connected by lead 43 to the movable contact 44 of relay switch B, said switch including the longitudinally movable armature 45 and the coil 46, which is joined on one side to power output line 18 by lead 47. The opposite side of coil 46 is grounded by lead wire 48.

Spaced contacts 49 and 50 are arranged upon opposite sides of movable contact 44 which is joined to armature 45 and as shown in the drawing contact 44 engages contact 50 for conducting electrical current from the electrode holder manual switch 37 through lead 51 to the coil 52 of starter relay switch C, which in the preferred embodiment operates at a relatively low voltage, as 24 volts A. C. current, for illustration. Relay B operates at a relatively higher voltage, such as 110 volts D. C. current and is normally energized by the generator.

Coil 52 of relay C is joined by lead wire 53 to the return lead 54 connecting the low voltage side 55 of the transformer shown in the drawing, which in the preferred embodiment, delivers 30 volts of A. C. current. The circuit is completed from the transformer element 55 through lead wire 56 which is joined to power line 18.

There is shown in Fig. 1 a pair of normally open contacts 57 and 58 forming a part of relay switch C and connected in the circuit 59 and 60 to the standard magnetic motor starter 33, hereafter described in further detail in connection with Fig. 2. Closing of contacts 57 and 58 under the control of the 24 volt A. C. magnetic coil 52 on application of manual switch 37, initiates the driving operation of motor 31, which is electrically connected with said starter and whose drive shaft 32 is suitably connected to the generator shaft 14.

Stationary contact 49 of 110 volt D. C. current relay switch B is connected by lead wire 61 to the 24 volt A. C. current magnetic coil 62 with the circuit completed through lead 54 to the low voltage output 55 of the transformer. As the voltage builds up in power line 18, coil 46 of relay B is energized moving armature 45 upwardly and interconnecting contacts 44 and 49 with said transformer to thereby bring together contacts 63 and 64 of relay D.

Contact 64 through lead 81 is connected with the 110 volt field rheostat operating motor 65 through brush contact 65'.

Brush contact 66' of rotor 30 through lead wire 66 connects movable contact 67 of the impulse double pole double throw relay switch F. In one position of longitudinally reciprocal relay operating shaft 74 under the control of cam 75, contact 67 engages contact 68 and through lead 69 joins motor field 70, and through lead 71 joins lower contact 72.

As shown in Fig. 1, this contact engages the movable contact 73 in the position of its actuator 74 shown and through leads 82 and 83 completes a circuit to the high output voltage side 79 of said transformer, which in the present instance delivers 110 volts of A. C. current. The complete circuit from transformer output 79 is through the lead 80 which joins movable contact 63 of relay D.

There is thus shown a completed circuit for driving rheostat motor 65; and the direction of rotation thereof will depend upon the position of the two movable contact 67 and 73 with respect to contacts 9 and 8 and contacts 68 and 72, respectively of impulse relay F.

Generally, it is apparent, that manual operation of switch 37 on electrode holder 34 operating through lead 43 and contacts 44 and 49, energizes relay coil 62 for closing the switches 63 and 64 starting the motor 65. Of course, this occurs after the generator has built up sufficient voltage through power line 18 which will energize coil 46 of relay B, so that contact 44 engages contact 49.

The reversals of impulse relay F are effected by intermittent rotary movements in a counter-clockwise direction of ratchet 77, which is axially joined at 78 to cam 75 by the shaft 76 for rotation in unison.

Ratchet impulse relay E includes a magnetic coil 85 which is connected through lead wire 84 to lead 81, and through lead 80 to transformer 79; and upon the opposite side of said coil through lead 86 joins lead 83 back to the opposite side of 110 volt A. C. transformer 79.

The ratchet impulse relay E includes operating arm 87 pivoted intermedaite its ends at 88 to the support 89; and normally maintained inoperative with armature 7 spaced from coil 85 by means of the coiled spring 90 joined to one end of arm 87. Pivotally connected to the opposite end of arm 87 and depending therefrom is a pawl 91 adapted for intermittent operative engagement with ratchet 77 for effecting incremental rotary movements of said ratchet.

There is also provided a flexible detent 92 which engages ratchet 77 to prevent reverse rotation thereof, said detent being adapted to pass over the ratchet elements as it is intermittently rotated in a counter-clockwise direction.

In operation it is apparent that energization of rheostat motor 65 will effect a simultaneous single energization of coil 85 as long as manual switch 37 is depressed because movable contact 73 of relay F is connected to either of the contacts 72 or 8 and its lead wire 9' which joins coil lead 69. This means that regardless of the direction of rotation of motor 65 depending upon which direction the current flows through the field 70, each actuation of manual switch 37 will effect an energization of relay coil E. This results in a rotary movement of ratchet 77 rotating cam 75 and thereby moving longitudinally reciprocal shaft 74 upwardly and moving the contacts 67 and 73, as shown into contact respectively with stationary contacts 9 and 8 respectively of relay F, contact 9 being joined by lead wire 10 to the lead wire 71.

This means that in operation the motor 65, which is preferably a low R. P. M. motor, such as 1 R. P. M., for illustration, will rotate in one direction or the other as long as the contact 37 is depressed by the operator.

As above described, this rotation is causing a corresponding rotation of rheostat arm 27 either increasing or decreasing resistances in the generator field circuit. If the rotation is such as to decrease the field resistance, such as a counter-clockwise rotation of arm 27, the voltage increases in power line 18 so that the welder has an increased voltage for the particular welding electrode 36. If he has too much voltage he can reduce the same by a second application of manual switch 37, which causes arm 27 to rotate in the opposite direction thereby increasing the field resistance through rheostat 26. This causes a reduction in the output voltage of generator 11.

For illustration, should the operator release the button 37 but then decide that he needs still less voltage, he must depress the button 37 twice inasmuch as the very next actuation of the button would tend to increase the voltage due to the reverse movement of arm 27. The second actuation of control 37 will cause arm 27 to move in the same direction as it previously moved to thereby further increase the output voltage.

There is incorporated in the present electrical control mechanism and in conjunction with relay A, a safety device whereby the motor 31 and the connected generator 11 can be automatically stopped should the welder discontinue the welding operation. For this purpose, relay A has a pair of normally closed contacts 38 which however, will be maintained open during welding due to the high current passing through coil 39. However, should the welding stop coil 39 is de-energized and contacts 38 are closed. There is then established through lead 41 and lead 93 a circuit through contact 94 and contact 95 and lead 96 to the heater wire or coil 97 which through lead 98 connects in series the timer rheostat 99 through lead 100 to the low voltage side 55 of the transformer. It will be recalled, however, that with the generator operating, coil 46 of relay B was energized and the armature 45 controlling contact 44 elevated, bringing contacts 94 and 95 together.

Heater 97 surrounds the bimetal support 101 for contact 102 which normally engages contact 103 and through lead 104 completes a closed circuit with the starter 33 through the lead 105.

If the welding is interrupted for a sufficient period of time, coil 97 gradually heats up the bimetal support 101 opening contacts 102 and 103 and shutting down the generator through the de-energization of motor 31.

Coil 46 of relay B then becomes inactive, armature 45 moves downwardly again closing contacts 44 and 50, separating contacts 94 and 95 restoring the control mechanism to the starting side again after the bimetal 101 has cooled off sufficiently to again close contacts 102 and 103.

Referring to Fig. 2, there is diagrammatically illustrated on an enlarged scale, the starter mechanism 33 of Fig. 1 to which is connected the three power lines 106, 107 and 108, which are respectively adapted for connection with the load lines 120, 121 and 122 which are joined to the motor 31 through the set of contacts, generally indicated at 9'' and under the control of the magnetic coil 111, which controls movement of the armature 110 joined to each of the contacts of load lines 120, 121 and 122.

There is also shown in Fig. 2 a starting button 112 for initially moving contact 113 into connection with contact 114, completing the circuit through the starting relay C and its lead lines 59 and 60, which connects starter 33 in the manner illustrated in Figs. 1 and 2, also connecting power line 108 through lead 115. Thus with starting button 112 actuated, the starter will be effective for energizing motor 31, just as soon as the operator of the electrode holder 34 applies the switch 37. This is accomplished in Fig. 1 because such actuation of switch 37 completes an electrical circuit through low voltage coil 52 of relay C with the low voltage side 55 of the transformer.

Assuming in the starting condition, contacts 102 and 103 are closed, there is completed an electrical circuit through the leads 105 and 104 shown in Figs. 1 and 2, whereby the magnetic coil 111 of the starter is initially energized upon the initial application of manual control 37. Coil 111 operates armature 110 so as to close all of the contacts 9" of the starter, to thereby energize motor 31 through the lead lines 120, 121 and 122.

There is also provided upon a suitable panel a stop button 116 which when actuated separates contact 117 from contact 118, the latter contact being connected to lead wire 105. It is thus apparent that depression of the stop 116 will break the circuit through the leads 104 and 105 to the starter and through lead 119, so that the starter is de-energized and contacts 9" automatically opened for shutting down motor 31 and generator 11 connected therewith.

Operation

With contacts 38 of relay A, contacts 44 and 50 of relay B and contacts 102 and 103 of the timer closed, the machine is upon the starting side of its cycle. Initial application of manual switch 37 upon the electrode holder 34 completes a circuit with the 30 volt section 55 of the transformer operating relay C and closing contacts 57 and 58 for energizing motor starter 33. This starts motor 31, in turn starting the generator 11 and setting the welder into operation.

As the generator voltage rises, coil 46 of relay B closes contacts 44 and 49, putting coil 62 of relay D in circuit with the 30 volt section 55 of the transformer.

By closing manual switch 37 again, a circuit is completed through relay A, leads 40, 43, closed contacts 44 and 49, leads 61 and 54 through coil 62 of relay D through transformer side 55 and returning through lead 56 to line 18.

Therefore, this latter actuation of switch 37 operates low voltage relay D closing contacts 63 and 64 and making a circuit to the motor armature 30 of rheostat driving motor 65 and its field 70 through the contacts 67 and 73 of impulse relay F selectively through either stationary contacts 68 and 72 or stationary contacts 8 and 9, completing the electrical circuit to the high voltage side 79 of the transformer. This sets in motion the low R. P. M. motor 65 for regulating the voltage arc in the welder inasmuch as the operation of said motor rotates the contact 27 of field rheostat 26 either cutting in or cutting out the field resistance.

This rotation of motor 65 or its drive shaft 29 will continue in one direction as long as contact 37 of electrode holder 37 is held in contact by the operator, it being contemplated, however, that the rotation of shaft 29 will be less than one complete rotation.

Coil 85 of relay E is also excited pulling armature 7 and moving ratchet pawl 91 into a tooth of ratchet gear 77 moving said ratchet in a counter-clockwise direction to a new position. As soon as the manual switch 37 is released, coil spring 90 returns the pawl to a new inoperative position ready for the next actuation of switch 37.

Said rotation of ratchet 77 rotates cam 75 in a counter-clockwise direction and elevates shaft 74 moving contacts 67 and 73 into connection with the upper stationary contacts 9 and 8 respectively for driving motor armature 30 in a pre-determined direction.

The next actuation of manual switch 37 causes an additional increment of rotary movement of cam 75 permitting shaft 74 to drop and switching contacts 67 and 73 into engagement with contacts 68 and 72 respectively for causing rotation of motor armature 30 in the reverse direction. A series of interruptions of contact 37 will alternately change the rotation of a motor driven rheostat armature 27, so that the operator has complete control of rheostat 26.

When an arc is made at the electrode 36 by the operator, relay coil 39 opens contacts 38 which will stay open as long as welding is continued. Thus, though contacts 94 and 95 are closed due to the operation of relay B, the timer will be out of circuit. However, just as soon as welding is stopped, current passing through coil 39 is interrupted permitting closing of contacts 38. This completes a circuit from said contacts through contacts 94 and 95 and through the heater 97 through the timer rheostat 99 and through the 30 volt winding 55 of the transformer and thence by lead 56 back to the generator cable 18, thus completing the circuit through leads 41 and 42.

As current continues to flow through the heater the bimetal eventually expands separating contacts 102 and 103, de-energizing the starter 33 and shutting down motor 31 and the generator 11 connected therewith.

Consequently, the coil 46 of relay B becomes inactive and contacts 44 and 50 are closed simultaneously opening contacts 94 and 95 and thus restoring the control mechanism to the starting side again, after the bimetal 101 has cooled off again, closing contacts 102 and 103, which control the stop section of the motor starter 33.

By the above control mechanism, the welder at the point of welding, which may be considerably remote from the generator, such as at the top of a building, may himself regulate the voltage of the welder.

Furthermore, the welder at such remote location can start the welding mechanism and the motor generator set-up at will. Furthermore, the welder control mechanism is so constructed that when welding is discontinued, it will shut itself down at a predetermined time.

As the contact switch 37 is operated by the thumb of the welder, the voltage can be changed while actual welding is being done, or while generator 11 is delivering large welding current.

Having described my invention, reference should now be had to the claims which follow for determining the scope thereof.

I claim:

1. In a welder including a generator having a power output line, an electrode holder connected to said line, an electric motor joined to said generator in driving relation, a magnetic starter adapted when energized for interconnecting said motor with a power source, a transformer, a normally open relay switch joined to said starter and including a magnetic control coil, an electric circuit interconnecting said transformer, control coil and electrode holder, a normally open manual switch on said holder and connected into said circuit for energizing said coil and closing the relay switch to said starter, a normally closed relay switch including a magnetic coil connected in said power output line for opening said latter switch during welding, a normally closed bimetal timing switch connected in circuit with said starter, a heating element surrounding said bimetal switch and interconnecting said normally closed relay switch and said transformer with said power output line, whereby during no flow of welding current through the coil of said normally closed switch said heater is energized to open said timing switch after a predetermined heating interval automatically deenergizing said starter and motor shutting down said generator.

2. In a welder, a generator having a power output line and a field winding, an exciter having a field winding in series with said first field winding, an electrode holder connected to said line, a rotatable rheostat connected in series with said generator and exciter fields whereby rotation in one direction increases and in the opposite direction decreases the welding voltage, a motor joined to said rheostat, a transformer connected with said motor, and switch means including a normally open manual switch mounted upon said electrode holder and in circuit with said electrode holder, motor and transformer for intermittently energizing said motor for alternate movements in opposite directions.

3. The welder of claim 2, said switch means including a normally open relay switch connecting said motor with said transformer, and including a first magnetic coil connected with said transformer, and a second normally open relay switch connected with said first coil and including a second magnetic coil joined to said power output line, whereby as voltage builds up in said output line, said second coil is energized closing its corresponding relay switch energizing said first relay coil to close its corresponding switch to said motor.

4. The welder of claim 2, said switch means including a normally open relay switch connecting said motor with said transformer, and including a first magnetic coil connected with said transformer, a second normally open relay switch connected with said first coil and including a second magnetic coil joined to said power output line, whereby as voltage builds up in said output line, said second coil is energized closing its corresponding relay switch energizing said first relay coil to close its corresponding switch to said motor, said normally open manual switch on said electrode holder being connected in circuit with said second relay switch for energizing said first coil.

5. The welder of claim 2, said switch means including a normally open relay switch connecting said motor with said transformer, and including a first magnetic coil connected with said transformer, a second normally open relay switch connected with said first coil and including a second magnetic coil joined to said power output line, whereby as voltage builds up in said output line, said second coil is energized closing its corresponding relay switch energizing said first relay coil to close its corresponding switch to said motor, a normally open manual switch on said electrode holder connected in circuit with said second relay switch for energizing said first coil, a double pole double throw impulse relay switch interconnecting said rheostat motor with said transformer and for alternately changing the direction of rotation of said rheostat motor.

6. The welder of claim 2, said switch means including a normally open relay switch connecting said motor with said transformer, and including a first magnetic coil connected with said transformer, a second normally open relay switch connected with said first coil and including a second magnetic coil joined to said power output shaft, whereby as voltage builds up in said output line, said second coil is energized closing its corresponding relay switch for energizing said first relay coil to close its corresponding switch to said motor, a normally open manual switch on said electrode holder connected in circuit with said second relay switch for energizing said first coil, a double pole double throw impulse relay switch interconnecting said rheostat motor with said transformer and for alternately changing the direction of rotation of said rheostat motor, longitudinally reciprocal means for controlling said double pole relay switch, a rotatable cam engaging said reciprocal means, and a ratchet operating device joined to said cam and including a magnetic coil interconnecting said transformer and double pole relay switch, whereby upon each actuation of said manual control switch, said ratchet operating device is energized for automatically switching the polarity of said double pole double throw relay switch.

7. In a welder including a generator having a power output line, an electrode holder connected to said line, an electric motor joined to said generator in driving relation, a magnetic starter adapted when energized for inter-connecting said motor with a power source, a low voltage source, a normally open relay switch joined to said starter and including a magnetic control coil, an electric circuit inter-connecting said low voltage source, control coil and electrode holder, a normally open manual switch on said holder and connected into said circuit for energizing said coil and momentarily closing the relay switch to said starter, a normally closed relay switch including a magnetic coil connected in said power output line for opening said latter switch during welding, a normally closed bimetal timing switch connected in circuit with said starter, a heating element surrounding said bimetal switch and interconnecting said normally closed relay switch and said low voltage source with said power output line, whereby during no flow of welding current through the coil of said normally closed switch said heater is energized to open said timing switch after a pre-determined heating interval automatically de-energizing said starter and motor shutting down said generator.

8. In a welder, a generator having a power output line and a field winding, an exciter having a field winding in series with said first field winding, an electrode holder connected to said line, a rotatable rheostat connected in series with said generator and exciter fields whereby rotation in one direction increases and in the opposite direction decreases the welding voltage, a motor joined to said rheostat, a transformer having a high and low voltage output, switching means including a normally open manual switch mounted on said electrode holder and in circuit with said electrode holder, motor and transformer for intermittently energizing said motor for alternate movements in opposite directions, said switch means including a normally open relay switch connecting said motor with the high voltage output of said transformer, and including a first magnetic coil connected with the low voltage output of said transformer, and a normally open relay switch connected with said first coil and including a second magnetic coil joined to said power output line, whereby as voltage builds up in said output line, said second coil is energized closing its corresponding relay switch energizing said first relay coil to close its corresponding switch to said motor.

9. In an electric arc welder, a reversible motor for driving a rotatable field rheostat for a generator, a transformer having a low and high voltage output, a double pole double throw impulse relay switch, an electric circuit inter-connecting said relay switch, said motor and said high voltage output whereby in one position of said relay switch said motor rotates in one direction and in another position of said relay switch rotates in the opposite direction, longitudinal reciprocal means joined to said impulse relay switch for alternately switching its polarity, ratchet operated means engaging said reciprocal means for moving the same in opposite directions, a pawl intermittently engageable with said ratchet, a magnetic coil associated with said pawl for intermittently actuating the same and connected in the circuit of said motor and said high voltage output, a normally opened switch in circuit with said motor and high voltage output and having a magnetic coil in circuit with said low voltage output, a welding electrode holder, and a normally open manual switch on said holder in circuit with the coil of said latter normally open relay switch, whereby alternate actuations of said manual switch causes current to flow through said latter coil closing said latter normally open relay switch, energizing said motor and said pawl operating coil, successive actuations of said manual switch effecting automatic polarity reversals of said double pole relay switch.

References Cited in the file of this patent

UNITED STATES PATENTS 2,170,861     Hobart _____ Aug. 29, 1939